(12) United States Patent
Kim

(10) Patent No.: US 9,318,931 B2
(45) Date of Patent: Apr. 19, 2016

(54) WATER PUMP MOTOR, AND WATER PUMP USING SAME

(75) Inventor: Byoung Soo Kim, Anyang-si (KR)

(73) Assignee: AMOTECH CO., LTD. (KR)

( * ) Notice: Subject to any disclaimer, the term of this patent is extended or adjusted under 35 U.S.C. 154(b) by 547 days.

(21) Appl. No.: 13/371,913

(22) Filed: Feb. 13, 2012

(65) Prior Publication Data

US 2012/0183421 A1    Jul. 19, 2012

Related U.S. Application Data

(63) Continuation-in-part of application No. PCT/KR2010/005413, filed on Aug. 17, 2010.

(30) Foreign Application Priority Data

Aug. 17, 2009  (KR) .................... 10-2009-0075920
Feb. 8, 2010   (KR) .................... 10-2010-0011546

(51) Int. Cl.
*H02K 7/14*   (2006.01)
*F04D 13/06*  (2006.01)
(Continued)

(52) U.S. Cl.
CPC ...... *H02K 7/14* (2013.01); *F04D 13/06* (2013.01); *F04D 13/0606* (2013.01); *F04D 13/0626* (2013.01); *H02K 5/128* (2013.01);
(Continued)

(58) Field of Classification Search
CPC ..... F04D 13/06; F04D 29/007; F04D 29/406; F04D 29/42; F04D 29/426; F04D 29/605; F04D 29/62; F04D 29/628; F04D 13/0606; F04D 13/025; F04D 13/0626; F04D 13/0633; H02K 5/10; H02K 7/14; H02K 5/128

USPC ........ 417/423.11, 423.14, 424.2; 310/85, 86, 310/87, 104
See application file for complete search history.

(56) References Cited

U.S. PATENT DOCUMENTS 2,805,626 A * 9/1957 Pezzillo ............... F04D 5/00
                                                417/357
2,942,555 A * 6/1960 Pezzillo ............ F04D 13/0613
                                                 310/90
(Continued)

FOREIGN PATENT DOCUMENTS

JP   09-112480   5/1997
JP   10-205495   8/1998

OTHER PUBLICATIONS

International Search Report—PCT/KR2010/005413 dated Apr. 1, 2011.

*Primary Examiner* — Alexander Comley
(74) *Attorney, Agent, or Firm* — Cantor Colburn LLP

(57) ABSTRACT

Provided is a water pump motor that implements a waterproof structure of a motor using a cover to seal a stator, and a water pump using the same. The water pump motor includes: a lower case on top of which a cylindrical protrusion is provided; a stator whose lower portion is supported on top of the protrusion and is sealed by the lower case; a stator case that is formed of an annular trench shape that seals the inner circumferential portion; a rotational shaft whose lower portion is rotatably supported by a groove; a rotor placed at the upper-inner circumferential portion of the stator case and at the center of which the rotational shaft is coupled to thus rotate according to an action with respect to the stator; and an upper case coupled with the lower case in an inverted cup shape.

11 Claims, 8 Drawing Sheets

(51) Int. Cl.
  *H02K 5/128* (2006.01)
  *H02K 5/10* (2006.01)
  *H02K 5/167* (2006.01)
  *D06F 39/08* (2006.01)

(52) U.S. Cl.
  CPC ............. *H02K 11/33* (2016.01); *D06F 39/085* (2013.01); *H02K 5/10* (2013.01); *H02K 5/1672* (2013.01); *H02K 2211/03* (2013.01)

(56) References Cited

U.S. PATENT DOCUMENTS

| | | | | |
|---|---|---|---|---|
| 3,333,544 A * | 8/1967 | Turk | ............... | F04D 13/0606 310/86 |
| 3,572,982 A * | 3/1971 | Kozdon | ............... | 417/423.7 |
| 4,115,038 A * | 9/1978 | Litzenberg | ............... | H02K 5/128 415/912 |
| 4,234,293 A * | 11/1980 | Lightle | ............... | F04D 13/062 417/357 |
| 4,277,115 A * | 7/1981 | Stuwe | ............... | F16C 23/043 384/220 |
| 4,773,822 A * | 9/1988 | Jensen | ............... | F04D 29/20 415/146 |
| 4,898,518 A * | 2/1990 | Hubbard | ............... | A61M 1/101 415/230 |
| 5,009,578 A * | 4/1991 | Hyland | ............... | F04D 29/041 417/365 |
| 5,604,390 A * | 2/1997 | Ackermann | ............... | H02K 1/2766 310/156.56 |
| 5,618,168 A * | 4/1997 | Moon | ............... | F04D 29/167 415/170.1 |
| 5,785,013 A * | 7/1998 | Sinn | ............... | H02K 11/0073 123/41.44 |
| 5,890,880 A * | 4/1999 | Lustwerk | ............... | F04D 29/588 415/171.1 |
| 5,997,261 A * | 12/1999 | Kershaw et al. | ............... | 417/366 |
| 6,065,946 A * | 5/2000 | Lathrop | ............... | F04B 49/065 310/43 |
| 6,203,294 B1 * | 3/2001 | Turley | ............... | F04D 13/06 417/366 |
| 6,254,360 B1 | 7/2001 | Sato | | |
| 6,287,074 B1 * | 9/2001 | Chancellor | ............... | F04D 29/126 415/111 |
| 6,445,098 B1 * | 9/2002 | Materne | ............... | F04D 13/0626 310/418 |
| 6,604,917 B2 * | 8/2003 | Casper | ............... | F04D 13/0613 417/420 |
| 6,619,935 B1 * | 9/2003 | Kluth | ............... | F04D 15/0027 137/331 |
| 6,663,362 B1 * | 12/2003 | Lentz | ............... | H02K 1/145 310/253 |
| 2003/0039544 A1 * | 2/2003 | Yamazaki | ............... | A61M 1/101 415/206 |
| 2004/0108779 A1 * | 6/2004 | Boettger | ............... | H02K 5/08 310/89 |
| 2005/0042119 A1 * | 2/2005 | Chien | ............... | F04D 13/0633 417/423.14 |
| 2006/0034716 A1 * | 2/2006 | Marioni | ............... | F04D 29/0413 417/423.12 |
| 2006/0034717 A1 | 2/2006 | Castellone et al. | | |
| 2008/0061645 A1 * | 3/2008 | Yukitake | ............... | 310/89 |
| 2008/0175729 A1 * | 7/2008 | Kato et al. | ............... | 417/353 |
| 2008/0219864 A1 * | 9/2008 | Li | ............... | F04D 13/021 417/353 |
| 2009/0072647 A1 * | 3/2009 | Hino et al. | ............... | 310/156.15 |

* cited by examiner

WATER PUMP MOTOR, AND WATER PUMP USING SAME

TECHNICAL FIELD

The present invention relates to a water pump motor, and more particular to a water pump motor that implements a waterproof structure of a motor using a cover to seal a stator, and a water pump using the same.

BACKGROUND ART

In general, a water pump motor is used to drive a water pump that is installed in a drain water tank or is used as a driving source of a water pump that is used for circulation of a coolant that cools an engine. The water pump equipped with the water pump motor works under an environment that the inside of the water pump always directly contacts water.

Thus, a component that is called a mechanical seal is used in a water pump for sealing purposes in order to protect a motor from water when the water of the inside of the water pump is drained to the outside of the water pump or in order to prevent failure of bearings or shortened life of belts due to leakage of a coolant.

A conventional water pump that uses a mechanical seal requires a separate additional post-processing work in order to have the mechanical seal. Accordingly, a processing cost and a material cost for the mechanical seal rise up to thereby become a factor of raising the prime cost of the water pump using a water pump motor. In addition, water or foreign matters flowing from the outside of the water pump may be introduced into the water pump motor, to thereby cause breakdown of the motor.

A bearing structure for a water pump motor having a can cover in order to protect the water pump motor was disclosed in the U.S. Pat. No. 4,277,115. In the U.S. Pat. No. 4,277,115, a mount for calotte bearings in which a ring of an elastomer or of felt is disposed between the calotte bearing and a bearing support element and the calotte bearing and the bearing support element are provided with grooves in the region of this ring. The calotte bearing mount is particularly useful in pumps with canned motors for delivery of electrolyte liquid in fuel cell units.

In the above-described water pump having the can cover, water introduced into the water pump motor can be prevented to some extent. However, the can cover should be separately produced to be assembled with the motor, to thereby cause the prime cost of the water pump to rise and productivity to lower. Further, a waterproof structure for water entering from the outside of the water pump motor is not presented, to thus require for additional measures for waterproof.

Meanwhile, the water pump that is used for a washing machine may cause a phenomenon that foreign matters such as dirt and debris are introduced between an impeller and an upper housing and are attached onto the rear surface of the impeller, when the foreign matters separated from laundry are drained. This phenomenon may inhibit rotational movement of the impeller, and cause degradation of the motor.

DISCLOSURE

Technical Problem

To solve the above problems or defects, it is an object of the present invention to provide a water pump motor and a water pump using the same, in which a rotor and a stator are separated from each other using a stator case that seals the stator of the water pump motor and a printed circuit board (PCB) for motor control below the stator, to thus prevent leakage of water.

It is another object of the present invention to provide a water pump motor and a water pump using the same, which uses a stator case of a plastic injection mold that seals a stator of the water pump motor, to thereby enable a stator core to be inserted through the rear surface of the stator case during assembly so as to be simply assembled and to thus improve an efficiency of assembly, as well as to save the prime cost of the water pump.

still another object of the present invention to provide a water pump in which vortex creation wings are formed on the rear surface of an impeller is mounted within the drain housing of the water pump, to thereby prevent the inflow and attachment of foreign matters such as dirt and debris from the outside of the water pump and prevent the foreign matters from accumulating on a rotor.

It is yet another object of the present invention to provide a high-power motor in which a wholly inexpensive rotor of a high magnetic force is implemented by a combination of a main magnet made of an inexpensive ring-shaped isotropic magnet and a sub-magnet made of a number of anisotropic magnet pieces of a high magnetic force, to thereby provide the high-power motor having a hybrid type magnet structure that enables a high efficiency and high power motor using the high magnetic force rotor.

Technical Solution

To accomplish the above and other objects of the present invention, according to an aspect of the present invention, there is provided a water pump motor comprising:

a lower case on top of which a cylindrical protrusion is provided;

a stator whose lower portion is supported on top of the protrusion and is sealed by the lower case;

a stator case that is formed of an annular trench shape that seals the inner circumferential portion, outer circumferential portion and upper surface of the stator in which the lower portion which extends from the inner circumferential portion of the stator case is sealed by a circular sealing plate, and a groove is formed at the center of the stator case;

a rotational shaft whose lower portion is rotatably supported by the groove;

a rotor that is placed at the upper-inner circumferential portion of the stator case and at the center of which the rotational shaft is coupled to thus rotate according to an action with respect to the stator; and an upper case that is coupled with the lower case in an inverted cup shape so as to seal the upper surface and lateral surface of the stator case.

Preferably but not necessarily, the upper case further comprises:

a flange that is bent at right angles and that is extensively formed in the same length as that of the lower case; and a fastening unit that fastens the flange and the lower case.

Preferably but not necessarily, the rotor comprises:

a back yoke that creates a magnetic circuit and at the center of which the rotational shaft is coupled; and a main magnet that is formed of a ring shape so as to be coupled on the outer circumference of the back yoke and that is dividedly magnetized into a number of magnetic poles.

Preferably but not necessarily, the water pump motor further comprises:

a number of sub-magnets that are made into the same number of the number of the dividedly magnetized magnetic poles, and that are positioned adjacent to the back yoke and the main magnet.

Preferably but not necessarily, the water pump motor further comprises:

a rotor support that is formed on the top and bottom surfaces of the back yoke and the main magnet for integration.

Preferably but not necessarily, the water pump motor further comprises:

a middle case that is made into a circular plate shape on top of the inner circumferential portion of the stator case and that covers the rotor in a sealing state, in which the upper portion of the rotational shaft is rotatably supported at the center of the middle case.

Preferably but not necessarily, the water pump motor further comprises:

a lower bearing that is installed in the groove of the stator case to thereby rotatably support the rotational shaft; and an upper bearing that is installed at the center of the upper case to thereby rotatably support the rotational shaft.

Preferably but not necessarily, the water pump motor further comprises:

a control printed circuit board (PCB) whose outer circumferential portion is supported between the stator and the protrusion of the lower case, to thereby apply a drive signal for coil of the stator.

Preferably but not necessarily, the stator is characterized in that coil is wound on a number of T-shaped teeth and then sealing resin is molded into the outer circumferential portion.

Preferably but not necessarily, the rotor comprises:

a circular rod-shaped back yoke at the center of which the rotational shaft is coupled, on the outer circumferential surface of which a number of grooves are formed at regular intervals, and that creates a magnetic circuit;

a number of sub-magnets that are inserted and disposed into the number of the grooves of the back yoke; and a main magnet that is coupled on the outer circumferential portion of the back yoke in a ring shape and that is dividedly magnetized to have the same number of magnetic poles as that of the sub-magnets.

Preferably but not necessarily, the rotor comprises:

a circular rod-shaped back yoke at the center of which the rotational shaft is coupled, and that creates a magnetic circuit;

a main magnet that is coupled on the outer circumferential portion of the back yoke in a ring shape, that is dividedly magnetized into a number of magnetic poles as that of the sub-magnets, and on the inner circumferential portion of which a groove is formed for each magnetic pole; and a number of sub-magnets that are made into the same number as that of the dividedly magnetized magnetic poles and that are inserted into the grooves.

Preferably but not necessarily, the sub-magnets are made into anisotropic magnet pieces and the main magnet is made into isotropic magnet pieces.

According to another aspect of the present invention, there is provided a water pump comprising:

a lower case on top of which a cylindrical protrusion is provided;

a stator whose lower portion is supported on top of the protrusion and is sealed by the lower case;

a stator case that is formed of an annular trench shape that seals the inner circumferential portion, outer circumferential portion and upper surface of the stator in which the lower portion which extends from the inner circumferential portion of the stator case is sealed by a circular sealing plate, and a groove is formed at the center of the stator case;

a rotational shaft whose lower portion is rotatably supported by the groove;

a rotor that is placed at the upper-inner circumferential portion of the stator case and at the center of which the rotational shaft is coupled to thus rotate according to an action with respect to the stator;

an upper case that is coupled with the lower case in an inverted cup shape so as to seal the upper surface and lateral surface of the stator case;

an impeller that is coupled with the rotational shaft that is extended to the upper portion of the upper case and that comprises a number of wings that are radially formed from the central shaft of the impeller; and a pump drain housing that contains the impeller therein, whose lower portion is coupled with the upper case, and that guides a fluid flow path from the top portion to the later portion.

Preferably but not necessarily, the rotor comprises:

a back yoke that creates a magnetic circuit; and an isotropic main magnet that is formed of a ring shape so as to be coupled on the back yoke and that is dividedly magnetized into a number of magnetic poles.

Preferably but not necessarily, the rotor further comprises:

a number of anisotropic sub-magnets that are made into the same number as that of the dividedly magnetized magnetic poles of the isotropic main magnet, and that are disposed adjacent to the back yoke and the isotropic main magnet.

Preferably but not necessarily, the rotor is integrally formed on top and bottom surfaces of the back yoke and the isotropic main magnet in an insert-molding method using resin.

Preferably but not necessarily, the water pump further comprises:

a middle case that is made into a circular plate shape on top of the inner circumferential portion of the stator case and that covers the rotor in a sealing state, in which the upper portion of the rotational shaft is rotatably supported at the center of the middle case.

Preferably but not necessarily, the impeller comprises:

a coupler that is positioned at the center of the impeller;

a coupling hole that is positioned at the center of the coupler and that fixedly couples the rotational shaft;

a number of wings that are radially formed around the coupler;

a circular plate that supports the lower portions of the number of the wings; and a number of blades that are formed on the lower surface of the circular plate.

Preferably but not necessarily, the water pump further comprises:

a first sealing O-ring that is placed between the upper surface of the stator case and the upper case corresponding to the upper surface of the stator case; and a second sealing O-ring that is placed between the upper case and the pump drain housing.

Advantageous Effects

Therefore, the present invention provides a stator case that seals a stator and a printed circuit board (PCB) in the inside of a water pump motor, to thereby provide a complete waterproof structure.

In addition, the present invention uses a stator case with a waterproof structure, to thereby insert a stator into the stator case and to thus enhance an assembly efficiency of a water pump motor.

Furthermore, the present invention forms wings on the rear surface of an impeller that is mounted within a water pump drain housing, to thereby provide an effect of preventing inflow of foreign matters from the outside of a water pump motor.

The present invention uses a combination of a main magnet made of an inexpensive ring-shaped isotropic magnet and a sub-magnet made of a number of anisotropic magnet pieces of a high magnetic force, in which the sub-magnet is expensive but is made of a smaller number of the anisotropic magnet pieces than the conventional art case, to thereby provide a wholly inexpensive rotor of a high magnetic force and to thus implement a high-efficiency and high-power motor using the same.

BEST MODE

Hereinafter, preferred embodiments of the present invention will be described in detail with reference to the accompanying FIGS. 1 to 10.

Figure 1:
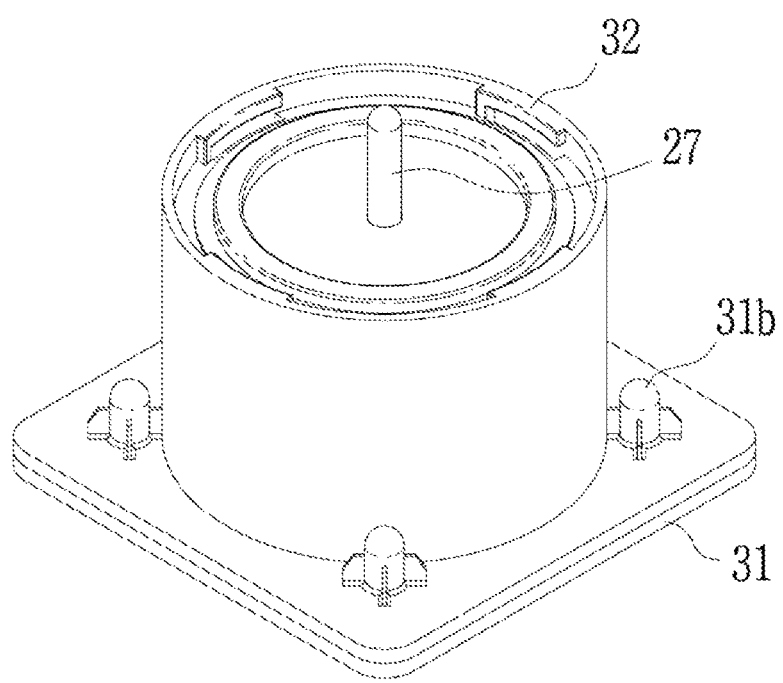
FIG. 1 is a perspective view of a water pump motor according to a first embodiment of the present invention.
Figure 2:
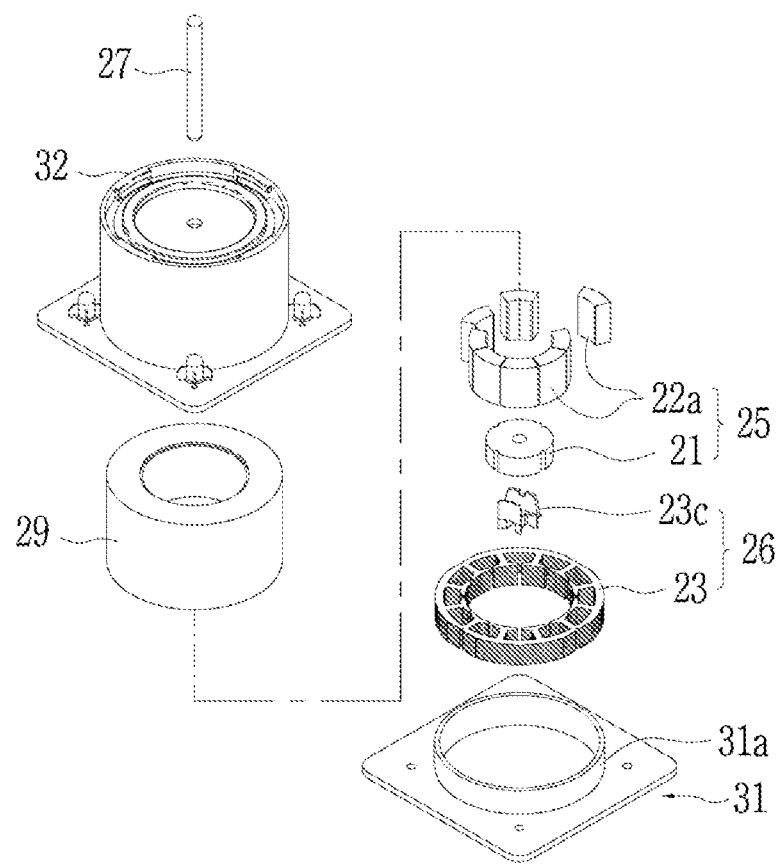
FIG. 2 is an exploded perspective view of the water pump motor of FIG. 1.
Figure 3:
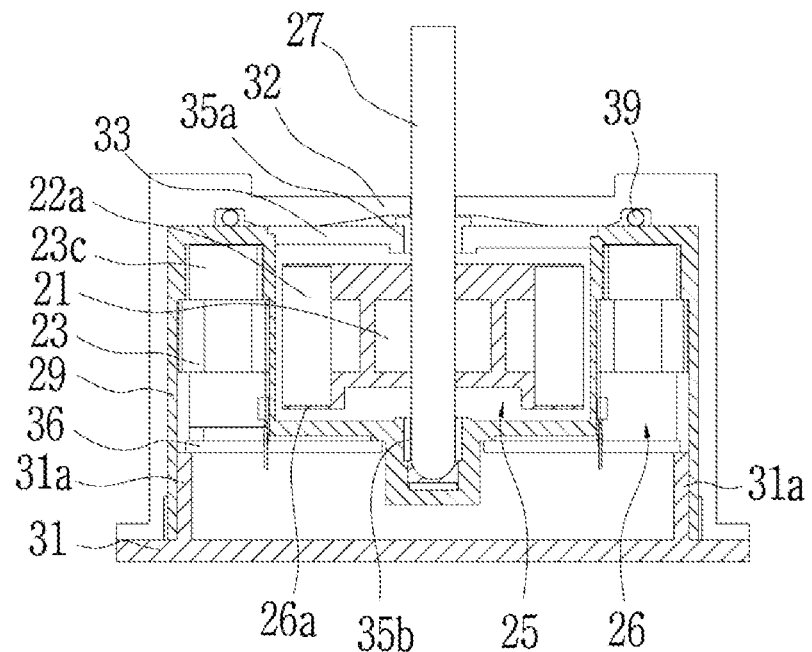
FIG. 3 is an axially cross-sectional view of the water pump motor of FIG. 2.

FIG. 1 is a perspective view of a water pump motor according to a first embodiment of the present invention. FIG. 2 is an exploded perspective view of the water pump motor of FIG. 1. FIG. 3 is an axially cross-sectional view of the water pump motor of FIG. 2.

Referring to FIGS. 1 to 3, a water pump motor according to a first embodiment of the present invention includes: a lower case 31 on top of which a cylindrical protrusion 31a is provided; a stator 26 whose lower portion is supported on top of the protrusion 31a and is sealed by the lower case 31; a stator case 29 that is formed of an annular trench shape that seals the inner circumferential portion, outer circumferential portion and upper surface of the stator 26 in which the lower portion which extends from the inner circumferential portion of the stator case 29 is sealed by a circular sealing plate (see 29d of FIG. 4), and a groove (see 29f of FIG. 4) is formed at the center of the stator case 29; a rotational shaft 27 whose lower portion is rotatably supported by the groove 29f; a rotor 25 that is placed at the upper-inner circumferential portion of the stator case 29 and at the center of which the rotational shaft 27 is coupled to thus rotate according to an action with respect to the stator 26; and an upper case 32 that is coupled with the lower case in an inverted cup shape so as to seal the upper surface and lateral surface of the stator case 29.

The respective configurational components of the water pump motor according to the first embodiment of the present invention will be described below in detail.

A trench-shaped stator case 29 whose inner circumferential surface is blocked at one side thereof, and an inverted cup-shaped upper case 32 are coupled in turn on the upper portion of a lower case 31 having a cylindrical protrusion 31a on top of a rectangular flange.

The stator 26 is inserted into the trench-shaped inner space of the stator case 29, and a rotor 25 that rotates around a central rotational shaft 27 is arranged on the upper-inner circumferential surface of the stator case 29.

A rectangularly protruding flange is formed at the lower end of an inverted cup-shaped cylindrical portion of the upper case 32, and lower case fasteners 31b that are protrudingly formed on respective corners of the lower flange of the lower case 31 are fastened to couple the upper case 32 with the lower case 31, in which a spiral tightener is provided in the leading end of each fastener 31b, for example.

The rotor 25 includes a back yoke 21 (that is a rotor core 21) that consists of a laminated magnetic steel plate and has a through-hole with which a rotational shaft 27 is coupled at the center of the rotor 25. A ring-shaped isotropic main magnet 22a is coupled on the outer circumferential surface of the back yoke 21. The ring-shaped isotropic main magnet 22a is dividedly magnetized so that N-pole magnets and S-pole magnets are alternately formed.

It is preferable that the rotor 25 is integrally formed with a rotor support 26a by using a resin on top and bottom surfaces of the back yoke 21 and the isotropic main magnet 22a in an insert-molding method.

The rotor support 26a is useful to seal inner elements of the water pump when a motor is used for the water pump that works under a humid environment.

The stator 26 includes: an integral stator core 23 having twelve substantially T-shaped protruding teeth so as to form twelve slots for example on the inner circumferential wall of a cylinder-shaped body by stacking a number of magnetic steel plates; a bobbin 23c made of an insulating resin that is coupled to cover the top and bottom surfaces of the stator core 23 and the inner circumferential surface and the top and bottom surfaces of the cylinder-shaped body to thus magnetically generate N-poles and S-poles of twelve phases for the integral stator core 23; and a stator coil (not shown) that is wound on the bobbin 23c.

In this case, the bobbin 23c may be formed in a structure that upper and lower bobbins are combined with each other, or may be integrated on the outer circumference of the core 23 by insert-molding the core 23.

In addition, the stator 26 may be implemented in an annular form by insert-molding the outer circumference of the core 23 using a bulk molding compound (BMC) in order to reinforce a sealing performance after coil has been wound on the bobbin 23c.

The stator 26 that is inserted into the inside of the stator case 29 and disposed on the upper portion of the lower case 31, and the rotor 25 that is coupled with the central rotational shaft 27 on the inner circumferential surface of the stator case 29, are sealed in a state where part of the rotational shaft 27 protrudes upwards from the upper case 32.

The bottom of the stator 26 is supported on the upper surface of a control printed circuit board (PCB) 36, and the control PCB 36 is supported by a cylindrical protrusion 31a protruding from the lower case 31.

Control devices for applying a drive signal to the coil of the stator 26 are mounted on the control PCB 36, and are supported with a gap spaced from the bottom of the lower case 31 by the cylindrical protrusion 31a extending from the lower case 31. The control devices that are mounted on the lower surface of the control PCB 36 are located in the gap paced from the bottom of the lower case 31.

Figure 4:
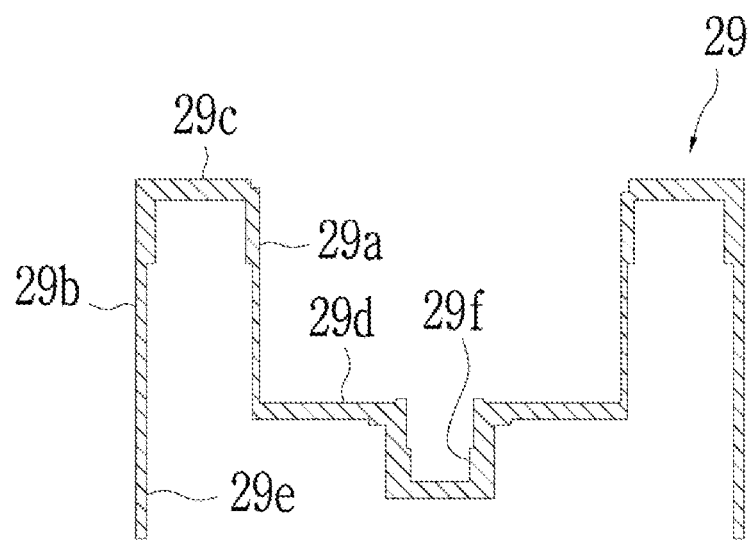
FIG. 4 is a cross-sectional view of a stator case of FIG. 3.

Referring to FIG. 4, both the cylindrical inner circumferential portion 29a and the outer circumferential portion 29b of the stator case 29 are connected at right angles with the upper surface 29c of the stator case 29, in order to form an annular trench structure downwards to thus seal and accommodate the annularly shaped stator 26.

In addition, a sealing plate 29d is extended at right angles at the lower end of the inner circumferential portion 29a of the stator case 29 in order to separate the stator 26 that is disposed in the inside of the trench of the stator case 29 and the rotor 25 that is placed in the inside of the stator 26, in a sealing state.

In addition, the lower end 29e of the outer circumferential portion of the stator case 29 is formed relatively longer than the lower end of the inner circumferential portion 29a of the stator case 29. Preferably, the lower end 29e of the outer circumferential portion of the stator case 29 is extensively formed a little longer than height of the cylindrical protrusion 31a of the lower case 31.

In addition, a groove 29f is provided at the center of the circular sealing plate 29d that is integrally formed at the lower end of the inner circumferential portion 29a of the stator case 29. A lower bearing 35b made of a sleeve bearing is mounted at the groove 29f in order to rotatably support the lower end of the rotational shaft 27.

Furthermore, a middle case 33 formed into a circular plate shape is coupled on the upper side of the inner circumferential portion 29a of the stator case 29, to thus cover the rotor 25 that is placed on the inner circumferential portion 29a of the stator case 29 in a sealing state.

In addition, a plastic upper bearing 35a is installed at the center of the middle case 33 to thereby rotatably support the upper end of the rotational shaft 27.

A sealing O-ring 39 is arranged at a place corresponding to the upper surface 29c of the stator case 29 and the upper case 32, and the rotational shaft 27 is installed at the center of the upper case 32 to then penetrate the center of the upper case 32 so as to be extended to the outside of the water pump motor.

In this case, it is possible to design the water pump motor from which the middle case 33 is removed as needed and in which the upper bearing 35a is installed at the center of the upper case 32, to thus support the rotational shaft 27.

The stator case 29 completely isolates the stator 26 and the control PCB 36 that is placed on the bottom of the stator 26 from the outside of the water pump motor, and thus is useful to seal inner elements of the water pump when a motor is used for the water pump that works under a humid environment.

Figure 5:
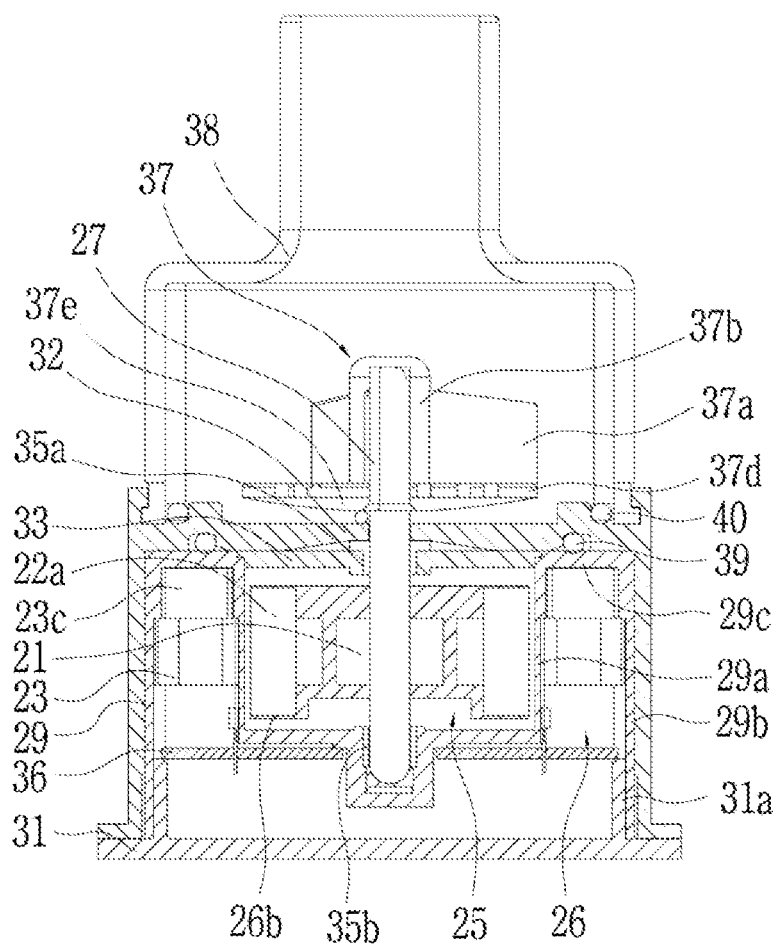
FIG. 5 is an axially cross-sectional view of a water pump using the water pump motor of FIG. 2.

As shown in FIG. 5, when the water pump motor according to the present invention is applied in a water pump, an impeller 37 is coupled with the rotational shaft 27 that is exposed upwards from the upper case 32, and a pump drain housing 38 is coupled on the upper side of the upper case 32 in a state sealed by a sealing O-ring 40.

Thus, in the case of the water pump motor according to the present invention configured as described above, the stator 26 is built in the lower space of the stator case 29 whose upper surface forms a sealing structure and the control PCB 36 is coupled on the lower surface of the stator case 29, to thus achieve a primary sealing.

In addition, the outer circumferential portion 29b and the upper surface 29c of the stator case 29 are sealed by the upper case 32 and the sealing O-ring 39, and the inner surface of the lower end of the stator case 29 is covered with the cylindrical protrusion 31a protruding from the lower case 31. Simultaneously, the outside of the stator 26 is doubly sealed by coupling of the upper and lower cases 32 and 31.

Thus, although water flows into the inside of the pump drain housing 38 through the rotational shaft 27 of the rotor 25, a water-resistant function is maintained by the double sealing of the stator 26.

Meanwhile, in the case that a water pump is implemented by using the water pump motor shown in FIG. 3, the central portion of the impeller 37 is fixed on the upper end of the rotational shaft 27 at a certain distance from the upper surface of the upper case 32 as illustrated in FIG. 5.

Referring to FIG. 5, the impeller 37 is accommodated in the inside of the upper case 32 on the upper surface of the upper case 32. In addition, the pump drain housing 38 that serves as a guide for discharging water that is introduced from the upper side of the upper case 32 to the lateral side thereof is detachably coupled on the upper surface of the upper case 32.

The pump drain housing 38 has a coupling and fastening structure with the upper case 32 in which a number of stoppers extending outwardly at the lower end of the pump drain housing 38 are coupled into a number of internal grooves that are formed on the upper surface of the upper case 32, and then the pump drain housing 38 is rotated with respect to the upper case 32 to thus make the pump drain housing 38 and the upper case 32 fastened with each other.

A number of wings 37a that are coupled on and fixed to the upper end of the rotational shaft 27, so as to discharge fluid such as water that flows in from an entrance of the pump drain housing 38 through an exit that is placed at the side of the pump drain housing 38 when the rotational shaft 27 is made to rotate according to rotation of the rotor 25, are radially formed on the impeller 37.

Figure 6:
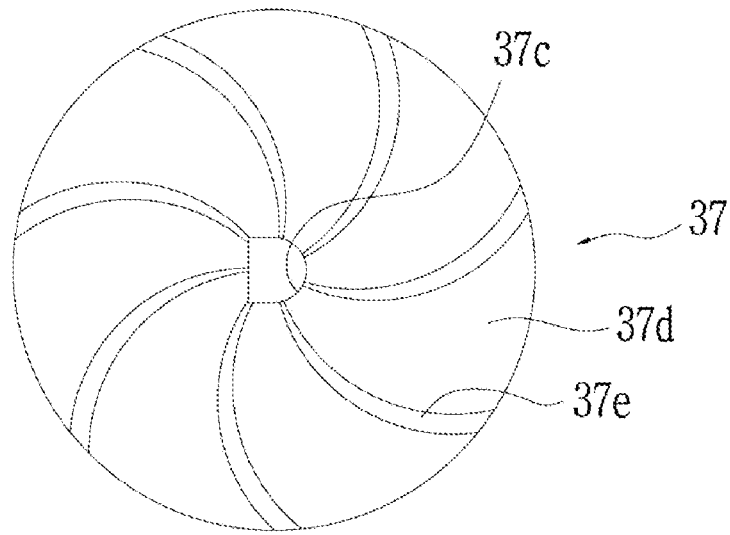
FIG. 6 is a front view showing the lower surface of an impeller of the water pump of FIG. 5.

FIG. 6 is a front view showing the lower surface of an impeller of the water pump of FIG. 5.

Referring to FIGS. 5 and 6, a coupler 37b is formed at the center of the impeller 37. A coupling hole 37c with and to which the rotational shaft 27 is coupled and fixed is formed at the center of the coupler 37b. A number of the wings 37a and a circular plate 37d supporting the lower ends of the wings 37a are formed around the coupler 37b. In this case, according to an embodiment of the present invention, a number of wing blades 37e that are spirally extended from the center of the circular plate 37d are integrally formed on the lower surface of the circular plate 37d of the impeller 37.

As a result, the impeller 37 generates pressure by a number of the wing blades 37e during rotation while maintaining a gap between the impeller 37 and the upper surface of the upper case 32, to thus cause incoming foreign matters together with water to be inaccessible to the circular plate 37d, and discharge the accumulated foreign matters to the outside of the upper case 32 by the pressure.

Figure 7:
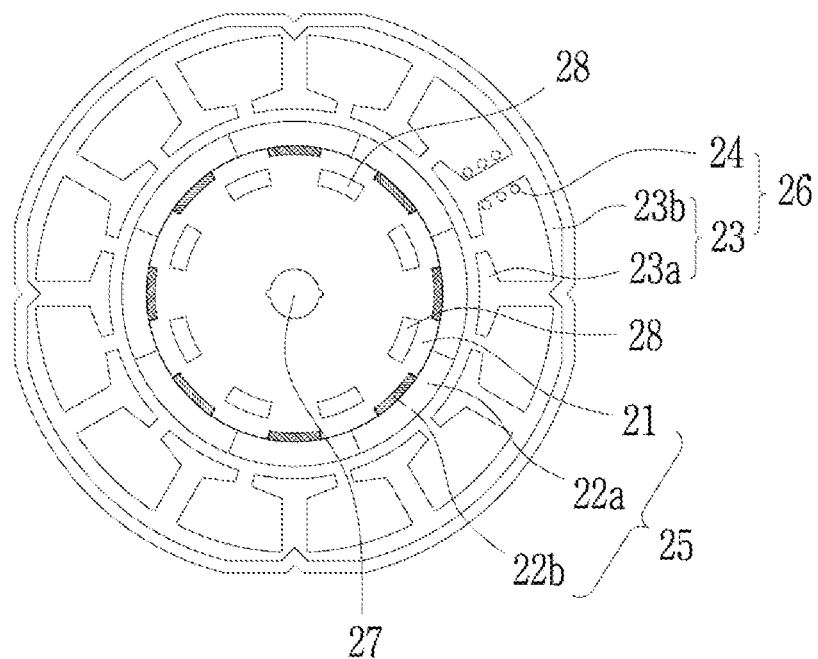
FIG. 7 is a circumferentially cross-sectional view of a water pump motor according to a second embodiment of the present invention.

FIG. 7 is a circumferentially cross-sectional view of a water pump motor according to a second embodiment of the present invention.

Referring to FIG. 7, the water pump motor according to the second embodiment of the present invention includes a rotor 25 and a stator 26. A rotational shaft 27 is coupled at the center of the rotor 25. For convenience of explanation, a stator case 29 that seals the stator 26 is not shown in FIG. 7.

The water pump motor according to the second embodiment of the present invention shown in FIG. 7 is designed to have an 8-pole/12-slot structure, for example. Since the number of the poles and slots can be increased in correspondence to the case that size of the water pump motor is increased in order to increase power of the motor, the present invention is not limited thereto.

The stator 26 includes: an integral stator core 23 having twelve substantially T-shaped protruding teeth 23a so as to form twelve slots on the inner circumferential wall of a cylinder-shaped body 23b by stacking a number of magnetic steel plates; a bobbin (not shown) made of an insulating resin that is coupled to cover the top and bottom surfaces of the teeth and the inner circumferential surface and the top and bottom surfaces of the cylinder-shaped body to thus magnetically generate N-poles and S-poles of twelve phases for the integral stator core 23; and a stator coil 24 that is wound on the bobbin (not shown).

A back yoke 21 of the rotor 25 is formed by stacking a number of magnetic steel plates like the stator 26, and the rotor 25 is rotatably disposed inwards from the stator 26 and spaced by a certain gap apart from the stator 26.

In this case, an integral stator core 23 may be formed into a split core structure as needed.

In addition, the rotor 25 includes the back yoke 21 (that is a rotor core 21) that consists of a laminated magnetic steel plate and has a through-hole with which the rotational shaft 27 is coupled at the center of the rotor 25. Eight grooves are formed for a predetermined angle on the outer circumferential surface of the back yoke 21. Accordingly, eight segment-shaped burial-type anisotropic sub-magnets 22b are inserted into the eight grooves.

The burial-type anisotropic sub-magnets 22b are obtained by using a ferromagnetic material made of a strong magnet, for example, a rare-earth alloy of $SmCo_5$ group, $Sm_2Co_{17}$ group, $Nd_2Fe_{14}B$ group, or $Sm_2Fe_{17}N_3$ group. In particular, it desirable that the Nd group alloy having a large energy product (BHmax) is for example Nd—Fe—B (anisotropic magnet).

Furthermore, an isotropic main magnet 22a that is made of for example a ferrite group material that can be purchased at low cost and is formed in the shape of a ring is coupled on the outer circumference of the back yoke 21. The ring-shaped isotropic main magnet 22a is dividedly magnetized so that N-pole magnets and S-pole magnets are alternately formed in the same number of poles as that of the eight segment-shaped burial-type anisotropic sub-magnets 22b.

In the case that the ring-shaped isotropic main magnet 22a is coupled on the outer circumference of the back yoke 21 as described above, the segment-shaped burial-type anisotropic sub-magnets 22b that have been inserted into the grooves that are formed on the outer circumferential surface of the back yoke 21 are naturally prevented from seceding even during rotation of the rotor 25. Accordingly, a separate secession-preventive structure is no longer needed.

The anisotropic sub-magnets 22b are magnetized in a radial direction of the rotor 25 to thereby form an anode, and to thus generate a permanent magnet torque by an interaction between rotating magnetic fields that are formed by a magnetic flux due to the anisotropic sub-magnets 22b and electric current flowing in the coil 24 of the stator 26.

In this case, the rotor 25 in the present invention is configured by using eight anisotropic sub-magnets 22b so as to have an 8-pole magnetic pole structure, in which four anisotropic sub-magnets 22b are magnetized so that the outer circumferential surface of each anisotropic sub-magnet 22b is set as an N-pole and the inner circumferential surface thereof is set as an S-pole in a diametrical direction, and the remaining four anisotropic sub-magnets 22b are magnetized so that the outer circumferential surface of each anisotropic sub-magnet 22b is set as an S-pole and the inner circumferential surface thereof is set as an N-pole in a diametrical direction. The eight anisotropic sub-magnets 22b are used by alternately disposing the magnetic piece whose outer circumferential surface is magnetized as an N-pole and the magnetic piece whose outer circumferential surface is magnetized as an S-pole.

In addition, the ring-shaped isotropic main magnet 22a has eight poles and is dividedly magnetized so that the N-pole and S-pole are alternately formed. Therefore, the anisotropic sub-magnets 22b that are disposed in the inner side of the isotropic main magnet 22a are magnetized so that the outer circumferential surface of each anisotropic sub-magnet 22b and the inner circumferential surface of the isotropic main magnet 22a corresponding to the outer circumferential surface of each anisotropic sub-magnet 22b are magnetized to have respectively different poles.

Meanwhile, eight leakage-preventive holes, that is, spacers 28 are circularly disposed along the inner side of the circumferential direction of the eight burial-type anisotropic sub-magnets 22b and are formed at regular intervals by a length corresponding to that of each anisotropic sub-magnet 22b between two anisotropic sub-magnets 22b. The spacers 28 enlarge magnetic resistance to thus prevent magnetic flux from leaking. As a result, the eight burial-type anisotropic sub-magnets 22b create a magnetic circuit from the N-pole to the S-pole in a lateral direction, that is, in a circumferential direction, respectively.

As a result, the rotor 25 of the present invention having the above-described structure has a hybrid magnet structure having an overall 8-pole magnetic pole by a mutual combination of the eight burial-type anisotropic sub-magnets 22b and the ring-shaped isotropic main magnet 22a that is magnetized into eight poles. The hybrid magnet can entirely maintain a magnetic force not less than those of the anisotropic sub-magnets 22b, due to the anisotropically oriented burial-type anisotropic sub-magnets 22b.

Figure 8:
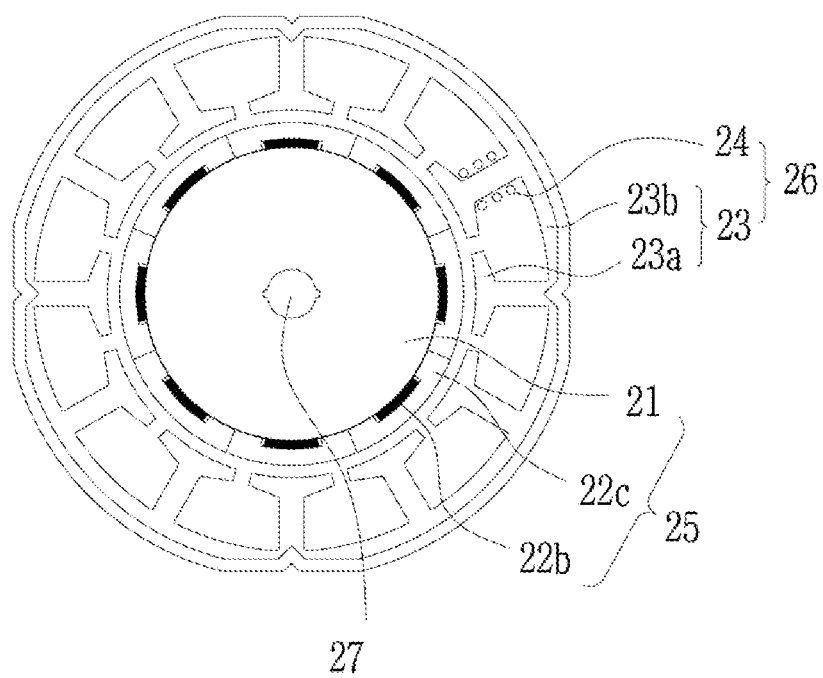
FIG. 8 is a circumferentially cross-sectional view of a water pump motor according to a third embodiment of the present invention.

FIG. 8 is a circumferentially cross-sectional view of a water pump motor according to a third embodiment of the present invention. The same elements as those of the second embodiment shown in FIG. 7 are assigned with the same reference numerals as those of FIG. 7. Accordingly, the detailed description thereof will be omitted.

Referring to FIG. 8, the water pump motor according to the third embodiment of the present invention includes a rotor 25 and a stator 26. A rotational shaft 27 is coupled at the center of the rotor 25.

For convenience of explanation, a stator case 29 that seals the stator 26 is not shown in FIG. 8.

The stator 26 has the same structure as that of the second embodiment of the present invention. A back yoke 21 of the rotor 25 is formed by stacking a number of magnetic steel plates like the stator 26, and the rotor 25 is rotatably disposed inwards from the stator 26 and spaced by a certain gap apart from the stator 26. In this case, an integral stator core 23 may be formed into a split core structure as needed.

In addition, the rotor 25 includes the back yoke 21 (that is a rotor core 21) that consists of a laminated magnetic steel plate and has a through-hole with which the rotational shaft 27 is coupled at the center of the rotor 25. An isotropic main magnet 22c that is made of for example a ferrite group material and that is formed into a ring shape is coupled on the outer circumference of the back yoke 21. The ring-shaped isotropic main magnet 22c has eight poles and is dividedly magnetized so that the N-pole and S-pole are alternately formed, in the same manner as that of the isotropic main magnet 22a of the second embodiment of the present invention. Eight grooves are circumferentially formed for each magnetic pole on the inner circumferential surface of the isotropic main magnet 22c. Accordingly, eight segment-shaped burial-type anisotropic sub-magnets 22b are inserted into the eight grooves.

The anisotropic sub-magnets 22b are magnetized in a radial direction of the rotor 25 to thereby form an anode, and to thus generate a permanent magnet torque by an interaction between rotating magnetic fields that are formed by a magnetic flux due to the anisotropic sub-magnets 22b and electric current flowing in the coil 24 of the stator 26.

In this case, the rotor 25 in the present invention is configured by using eight anisotropic sub-magnets 22b so as to have an 8-pole magnetic pole structure, in which four anisotropic sub-magnets 22b are magnetized so that the outer circumferential surface of each anisotropic sub-magnet 22b is set as an N-pole and the inner circumferential surface thereof is set as an S-pole in a diametrical direction, and the remaining four anisotropic sub-magnets 22b are magnetized so that the outer circumferential surface of each anisotropic sub-magnet 22b is set as an S-pole and the inner circumferential surface thereof is set as an N-pole in a diametrical direction. The eight anisotropic sub-magnets 22b are used by alternately disposing the magnetic piece whose outer circumferential surface is magnetized as an N-pole and the magnetic piece whose outer circumferential surface is magnetized as an S-pole.

The anisotropic sub-magnets 22b are magnetized so that the outer circumferential surface of each anisotropic sub-magnet 22b and the inner circumferential surface of the isotropic main magnet 22c corresponding to the outer circumferential surface of each anisotropic sub-magnet 22b are magnetized to have respectively different poles.

The burial-type anisotropic sub-magnets 22b are obtained by using a ferromagnetic material made of a strong magnet, for example, a rare-earth alloy in the same manner as that of the second embodiment of the present invention. In particular, it desirable that the Nd group alloy having a large energy product (BHmax) is for example Nd—Fe—B (anisotropic magnet).

In the case that the ring-shaped isotropic main magnet 22c is coupled on the outer circumference of the back yoke 21 as described above, the segment-shaped burial-type anisotropic sub-magnets 22b that have been inserted into the grooves that are formed on the inner circumferential surface of the isotropic main magnet 22c are naturally prevented from seceding by the outer circumferential surface of the back yoke 21, that is, the segment-shaped burial-type anisotropic sub-magnets 22b are prevented from seceding even during rotation of the rotor 25. Accordingly, a separate secession-preventive structure is no longer needed.

In the case of the rotor 25 of the present invention that is configured by a mutual combination of the eight burial-type anisotropic sub-magnets 22b and the ring-shaped isotropic main magnet 22c that is magnetized into eight poles, the anisotropic sub-magnets 22b have a relatively stronger magnetic force than the ring-shaped isotropic main magnet 22c. A magnetic circuit is formed from the N-pole to the S-pole toward the other adjoining sub-magnets 22b through the back yoke 21 of each rear surface from the anisotropic sub-magnets 22b.

Figure 9:
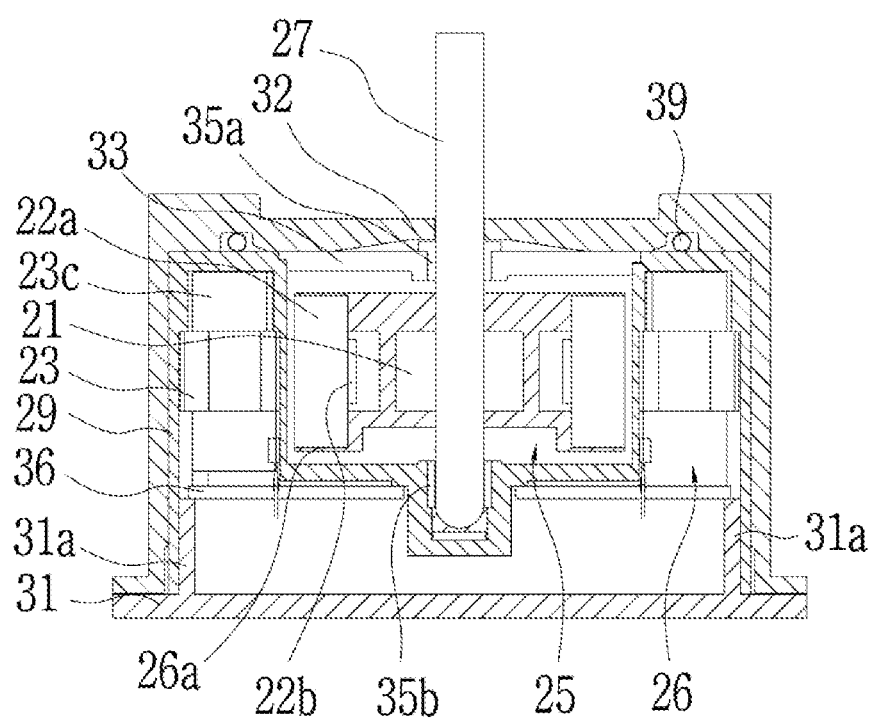
FIG. 9 is an axially cross-sectional view of the water pump motor of FIG. 7.
Figure 10:
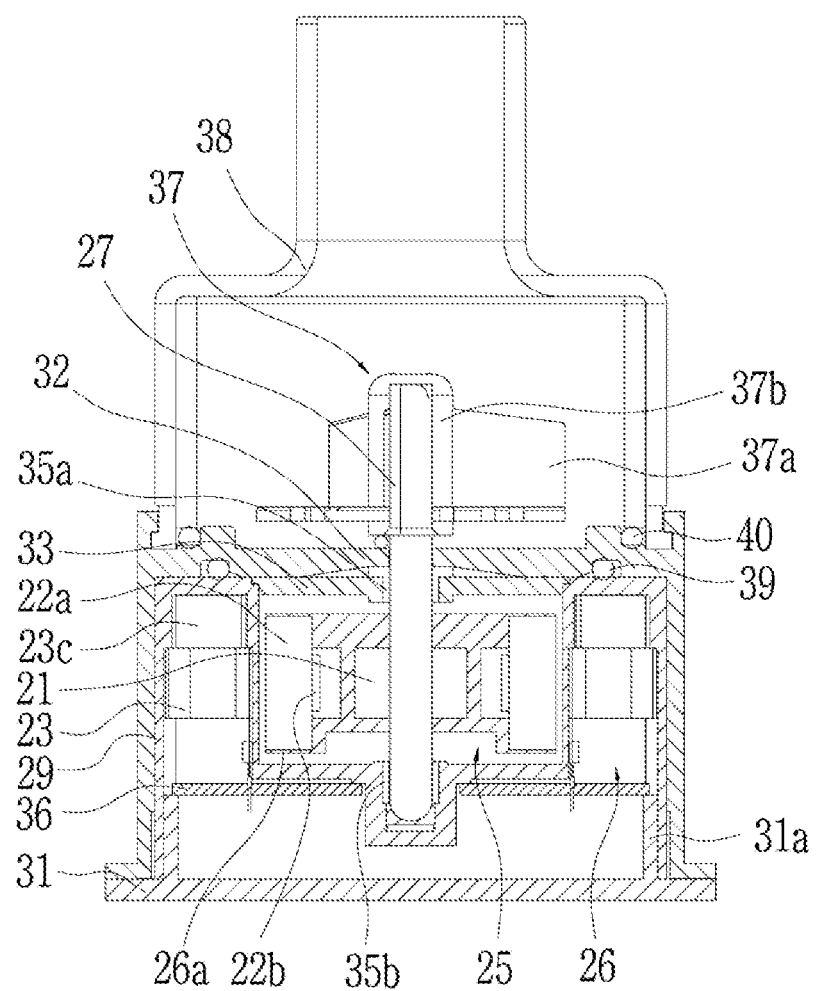
FIG. 10 is an axially cross-sectional view of a water pump using the water pump motor of FIG. 7.

FIG. 9 is an axially cross-sectional view of the water pump motor according to the second embodiment of the present invention of FIG. 7 that is designed for a water pump. FIG. 10 is an axially cross-sectional view of a water pump using the water pump motor of FIG. 9.

In the water pump motor shown in FIG. 9 and the water pump shown in FIG. 10, the same elements as those of FIGS. 4 and 5 are assigned with the same reference numerals as those of FIGS. 4 and 5. Accordingly, the detailed description thereof will be omitted.

Here, since the water pump motor according to the second embodiment of FIG. 7 has been applied in FIGS. 9 and 10, FIGS. 9 and 10 are identical to FIGS. 3 and 5, respectively, excepting that the anisotropic sub-magnets 22b are added into the grooves of the outer circumferential surface of the back yoke 21.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

As described above, the present invention seals the stator and the control PCB using the stator case made of an annular trench structure, to thereby implement a perfect waterproof structure, and prevents foreign matters from attachment using auxiliary wings of the impeller, to thus be applied for a water pump.

The invention claimed is:
1. A water pump motor comprising:
a lower case on top of which a cylindrical protrusion is provided;
a stator whose lower portion is supported on top of the cylindrical protrusion and is sealed by the lower case;
a stator case formed of an inner circumferential portion, an outer circumferential portion and an upper surface between upper end portions of the inner and outer circumferential portions, wherein a lower portion which extends from the inner circumferential portion of the stator case is sealed by a circular sealing plate, and a groove is formed at a center of the circular sealing plate, wherein the stator case is monolithically formed as a single piece having the inner circumferential portion, the outer circumferential portion, the upper surface and the circular sealing plate, which together form an annular trench accommodating the stator, and wherein a lower distal end portion of the outer circumferential portion is disposed below a bottom surface of the groove so as to abut against an upper surface of the lower case, and wherein the outer circumferential portion abuts and surrounds an outer circumferential surface of the cylindrical protrusion, thereby coupling the lower case and the stator case to each other;
a rotational shaft whose lower portion is rotatably supported by the groove;
a rotor that is placed at an upper-inner circumferential portion of the stator case and having its center coupled to the rotational shaft to thus rotate according to an action with respect to the stator; and
an upper case having an inverted cup shape and coupled directly with the lower case in such a way that an inner circumferential surface of the upper case is fitted circumferentially around an outer circumferential surface of the outer circumferential portion of the stator case, wherein an O-ring is disposed between the upper surface of the stator case and an inner surface of the upper case,
a middle case having a circular plate shape and disposed on top of the upper-inner circumferential portion of the stator case and inside the upper case to fluidically seal the rotor in a sealing state, wherein an upper portion of the rotational shaft is rotatably supported at a center of the middle case,
wherein an upper bearing is installed at the center of the middle case to thereby rotatably support the rotational shaft.

2. The water pump motor according to claim 1, wherein the upper case further comprises:
   a flange that is bent at right angles at a lower portion of the upper case; and
   a fastening unit that fastens the flange and the lower case.

3. The water pump motor according to claim 1, wherein the rotor comprises:
   a back yoke that creates a magnetic circuit and at a center of which the rotational shaft is coupled; and
   a main magnet that is formed of a ring shape so as to be coupled on an outer circumference of the back yoke and that is dividedly magnetized into a number of magnetic poles.

4. The water pump motor according to claim 3, wherein the rotor further comprises:
   a number of sub-magnets corresponding to the number of the dividedly magnetized magnetic poles, and positioned adjacent to the back yoke and the main magnet.

5. The water pump motor according to claim 4, further comprising:
   a rotor support that is formed on top and bottom surfaces of the back yoke and the main magnet for integration.

6. The water pump motor according to claim 1, further comprising:
   a lower bearing that is installed at the groove of the circular sealing plate to thereby rotatably support the rotational shaft.

7. The water pump motor according to claim 1, further comprising: a control printed circuit board (PCB) whose outer circumferential portion is supported between the stator and the cylindrical protrusion of the lower case, to thereby apply a drive signal for a coil of the stator.

8. The water pump motor according to claim 1, wherein the stator is characterized in that a coil is wound on a number of T-shaped teeth and then sealing resin is molded into an outer circumferential portion of the stator.

9. The water pump motor according to claim 1, wherein the rotor comprises:
   a circular rod-shaped back yoke at a center of which the rotational shaft is coupled, on an outer circumferential surface of which a number of grooves are formed at regular intervals, and that creates a magnetic circuit;
   a number of sub-magnets that are inserted and disposed in the grooves of the back yoke; and
   a main magnet that is coupled on an outer circumferential portion of the back yoke in a ring shape and that is dividedly magnetized to have a number of magnetic poles corresponding to the number of the sub-magnets.

10. The water pump motor according to claim 1, wherein the rotor comprises:
    a circular rod-shaped back yoke at a center of which the rotational shaft is coupled, and that creates a magnetic circuit;
    a main magnet that is coupled on an outer circumferential portion of the back yoke in a ring shape, that is dividedly magnetized into a number of magnetic poles, and on an inner circumferential portion of which a groove is formed for each magnetic pole; and
    a number of sub-magnets corresponding to the number of the dividedly magnetized magnetic poles and inserted into the grooves.

11. The water pump motor according to claim 9, wherein the sub-magnets are made into anisotropic magnet pieces and the main magnet is made into isotropic magnet pieces.

* * * * *